(12) United States Patent
Childs et al.

(10) Patent No.: US 7,175,201 B2
(45) Date of Patent: Feb. 13, 2007

(54) VEHICLE BALLAST SYSTEM

(76) Inventors: Thomas Childs, Horizon Builders, Inc., P.O. Box 802, Portland, ME (US) 04104; George Froehlich, Horizon Builders, Inc., P.O. Box 802, Portland, ME (US) 04104; William C. Childs, Horizon Builders, Inc., P.O. Box 802, Portland, ME (US) 04104

( * ) Notice: Subject to any disclaimer, the term of this patent is extended or adjusted under 35 U.S.C. 154(b) by 51 days.

(21) Appl. No.: 11/096,863

(22) Filed: Apr. 1, 2005

(65) Prior Publication Data

US 2006/0220366 A1 Oct. 5, 2006

(51) Int. Cl.
*B60S 9/00* (2006.01)

(52) U.S. Cl. ........................ 280/759; 410/120

(58) Field of Classification Search ........... 280/757, 280/758, 759; 296/3, 37.6; 224/403, 557; 410/96, 97, 101, 106, 120
See application file for complete search history.

(56) References Cited

U.S. PATENT DOCUMENTS

| | | | |
|---|---|---|---|
| 3,508,764 A * | 4/1970 | Bexon et al. ............ | 410/90 |
| 4,335,987 A * | 6/1982 | Laxo ..................... | 414/27 |
| 5,657,916 A | 8/1997 | Tackett | |
| 5,897,138 A | 4/1999 | Hall | |
| 5,941,565 A | 8/1999 | Clendenin, Jr. | |
| 6,027,139 A | 2/2000 | Malinowski et al. | |
| 6,077,007 A | 6/2000 | Porter et al. | |
| 6,079,741 A | 6/2000 | Maver | |
| 6,575,679 B2 | 6/2003 | Bourgault et al. | |
| 6,752,301 B1 | 6/2004 | Drolet | |
| 2004/0119274 A1 | 6/2004 | Carty | |

* cited by examiner

*Primary Examiner*—Paul N. Dickson
*Assistant Examiner*—Tiffany L. Webb
(74) *Attorney, Agent, or Firm*—Verrill Dana, LLP; Chris A. Caseiro

(57) ABSTRACT

A vehicle ballast system for improving the balance of a vehicle. The system is particularly well suited for use in the bed of a pickup truck but is not limited to that deployment. The system includes one or more ballast units. Each ballast unit includes a frame set and a ballast element. The frame set retains the ballast element therein. The ballast element may be one or more concrete blocks. The frame set includes an upper frame and a lower frame. The respective frames are connected together in a manner to contain the ballast element using a front retaining rod and a rear retaining rod is preferably affixable to a bracket secured to the rear of the vehicle. A tether may be removably connected between the upper frame and a securing point of the vehicle. A shock-absorbing lanyard may be employed at the rear of the system as a restraint upon sudden deceleration of the vehicle.

20 Claims, 6 Drawing Sheets

VEHICLE BALLAST SYSTEM

BACKGROUND OF THE INVENTION

1. Field of the Invention

The present invention relates to systems for improving vehicle balance. The present also relates to such systems configured to improve stability and counterbalance overloaded vehicles axles. More particularly, the present invention relates to a ballasting system installable in the bed of a truck.

2. Description of the Prior Art

Most vehicles are configured with the engine at the front and storage capacity at the rear. As a result, such vehicles are generally unevenly weighted, setting up the possibility of a reduction in traction at the rear end. In the past, vehicles had rear-wheel drive, and drivers would add load or weight, referred to herein as ballast, at the vehicle rear to counterbalance the front-end loading and improve vehicle traction. Vehicle traction is particularly important when road conditions are less than optimal, such as when covered in snow, ice, or water. Advances in vehicle design have made front-wheel drive and all-wheel drive fairly standard features. Vehicles with front-wheel and all-wheel drive generally have better traction than those with rear-wheel drive, due to positioning of the engine weight over the driven wheels.

In spite of the advances in vehicle drive operation, there remains a substantial portion of vehicles without sufficient load balancing to operate effectively under all conditions. For example, drivers tasked to conduct snow removal operations, particularly those employing pickup trucks, often do not have sufficient ballast at the rear. In fact, the rear of the truck is usually simply an open or capped bed for storage. The truck's engine and an attached plow produce more loading at the front axle than at the rear. This can reduce traction at the rear end, and generally can reduce handling stability under a variety of road conditions. Many pickup trucks used for snow removal are equipped with four-wheel drive, at least ensuring that some traction is provided at the front and rear wheels. However, this does not balance the overloading of the front axle of the truck associated with the attached plow, nor does it improve vehicle handling.

Drivers use a variety of ad hoc techniques to overcome the inherent limitations associated with the unbalanced weight distribution of a pickup truck. Those techniques generally involve placing a load in the truck bed. That load may be sandbags, weightlifting weights, cinder blocks, water-filled containers, miscellaneous equipment, and even snow or ice accumulating naturally in the bed. Unfortunately, such loads may not be placed a sufficient distance behind the vehicle's center of gravity to balance the truck effectively. Moreover, these loads tend to shift when the truck is in use, or they may be insufficient to provide the desired traction, particularly when snowplowing is performed. In other instances, rather than shifting position, the load may become rigidly fixed in place, such as by ice gathering in the bed. Further, the load may be positioned in the truck bed in a way that makes it difficult to use the bed for its intended storage purpose, or in a way that makes it difficult to access other items in the bed, particularly when load shifting occurs. Therefore, present ad hoc means for improving rear-wheel traction and/or balance for a pickup truck have undesirable limitations.

Several patents have been granted for devices intended to improve traction for a vehicle. See, for example, U.S. Pat. Nos. 5,941,565, 5,897,138, and 6,079,741. The devices described in these patents are of limited value for one or more of several reasons. They may require substantial modification to a truck bed, they may require fixing in place rather than being easily movable in and out of the truck bed and within the truck bed. Further, they may require the introduction of a load that may not be easily removable, such as water that turns into ice in cold weather. Such loading may be difficult to adjust, either by adding to or subtracting from, the load as desired Therefore, what is needed is a vehicle ballast system that may be easily inserted into and removed from the storage area, preferably by a single individual and without the need of hoisting equipment. Also, what is needed is a vehicle ballast system that may be adjusted in its positioning as desired, but with the balancing of the vehicle's center of gravity kept in mind. In addition, what is needed is a vehicle ballast system that minimizes the impact on the use of the remaining portions of the vehicle's storage area. Further, what is needed is a vehicle ballast system that is configured in a manner that reduces or eliminates ballast shifting when the vehicle is in use.

SUMMARY OF THE INVENTION

It is an object of the present invention to provide a vehicle ballast system that may be easily inserted into and removed from the storage area of the vehicle, preferably by a single individual and without the need of hoisting equipment. It is also an object of the present invention to provide a vehicle ballast system that may be adjusted in its positioning as desired. Further, it is an object of the present invention to provide such a vehicle ballast system that minimizes the impact on the use of the remaining portions of the vehicle's storage area so that, for example, other equipment may be stored within the storage area if needed. Still further, it is an object of the present invention to provide a vehicle ballast system that is configured in a manner that reduces or eliminates ballast shifting when the vehicle is in use.

These and other objects of the present invention are achieved with the present invention, which is a vehicle ballast system particularly well suited for use in pickup truck storage beds, but not limited thereto. The system may be used under any condition where additional weight is required to counterbalance the front end of the vehicle in uneven loading conditions. For example, it may be used in a truck bed to improve traction when the truck is used for plowing snow. Specifically, ballast forming a portion of the system provides for improved balance in a manner that aids vehicle traction and improves vehicle handling in all conditions, particularly when the vehicle includes a front-end load, such as a plow.

The vehicle ballast system includes a pair of frames designed and arranged to retain therebetween a load, preferably, but not limited to, a plurality of concrete blocks, that is the ballast. Other materials may be used as the ballast. Further, it is contemplated that a single element is the ballast component. However, a plurality of pieces as the ballast enables the user to add to, or take away from, the overall load as conditions warrant. When the vehicle ballast system includes a plurality of ballast pieces, it is easier for a single individual to move the system without the need of hoisting equipment. The frame set is used to prevent the load from coming apart, assuming the load is formed of a plurality of pieces. The frame set is also used to secure the positioning of the load within the truck bed, and for ease of movement of the load to positions of interest, preferably toward the rear of the vehicle to enhance counterbalancing with minimal load. It is contemplated that at least a pair of loads, each retained by its own frame set, may be deployed toward the back of the vehicle's storage area at opposing sides thereof.

One of the frame set pieces is a lower frame and the other is an upper frame. Each of the frames includes two or more tabs extending outwardly from two or more sides of the frame. The lower frame is positioned where desired in the truck bed and the load positioned therein. The upper frame is then fitted about the installed load, with the tabs of the upper frame aligned with the tabs of the lower frame. Each tab includes a hole through which a retaining rod may be passed. The retaining rod preferably includes a handle for fixing the rod in place in the tab of the lower frame. One or more retaining straps may be secured between the frame set and to the vehicle body in a manner that substantially fixes the framed load in place.

The vehicle ballast system of the present invention allows for the easy placement and removal of ballast load when and where desired in the storage area of a vehicle, such as the bed of a truck. The present system allows for convenient and relatively rapid movement of the load. It also minimizes the amount of truck bed space used for ballast. These and other advantages and features of the invention will become more apparent upon review of the following detailed description, the accompanying drawings, and the appended claims.

DETAILED DESCRIPTION OF THE PREFERRED EMBODIMENT

Figure 1:
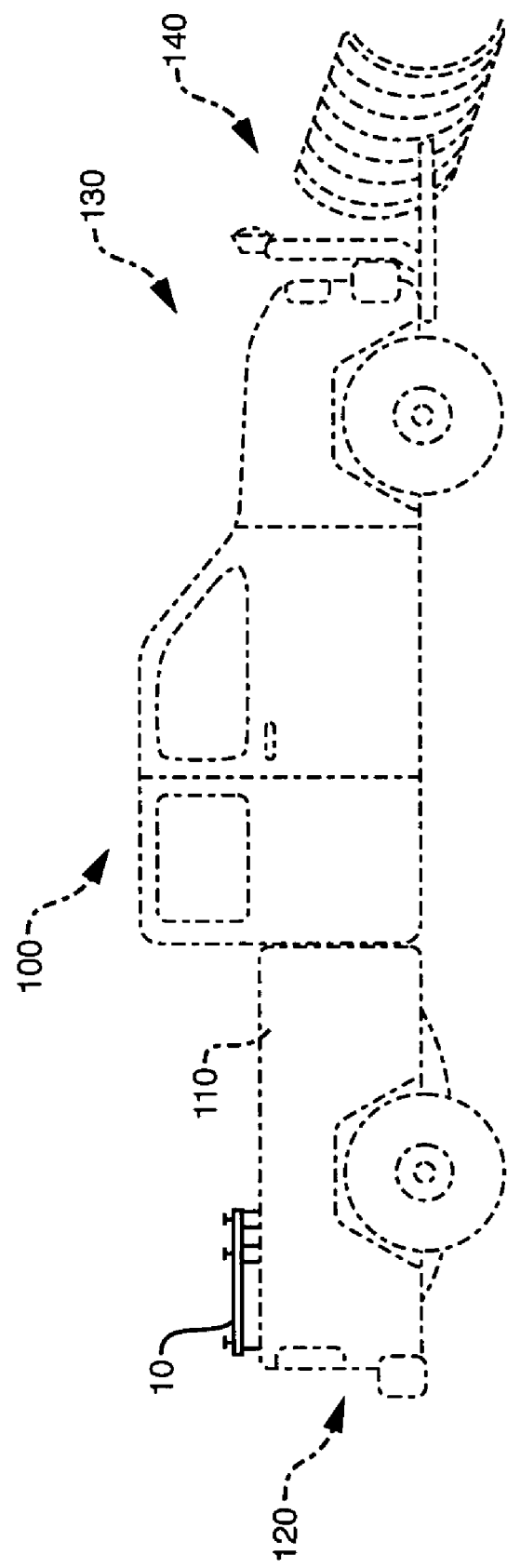
FIG. 1 is a side view of a pickup truck including the vehicle ballast system of the present invention.

A vehicle ballast system 10 of the present invention is shown in FIGS. 1–5. In FIG. 1, the vehicle ballast system 10 is shown positioned in a storage compartment (truck bed 110) of a vehicle (truck 100). The vehicle ballast system 10 may be deployed in any of a plurality of locations within the truck bed 110. However, it is preferably positioned at a back end 120 of the truck 100 to counterbalance any opposing weight or load at a front end 130 of the truck, such as the truck's engine (not shown), or a snowplow 140. The vehicle ballast system 10 may vary in dimensions as a function of the available space in the storage compartment, the ballast needed, and/or the material available to provide the ballast portion of the system 10.

Figure 2:
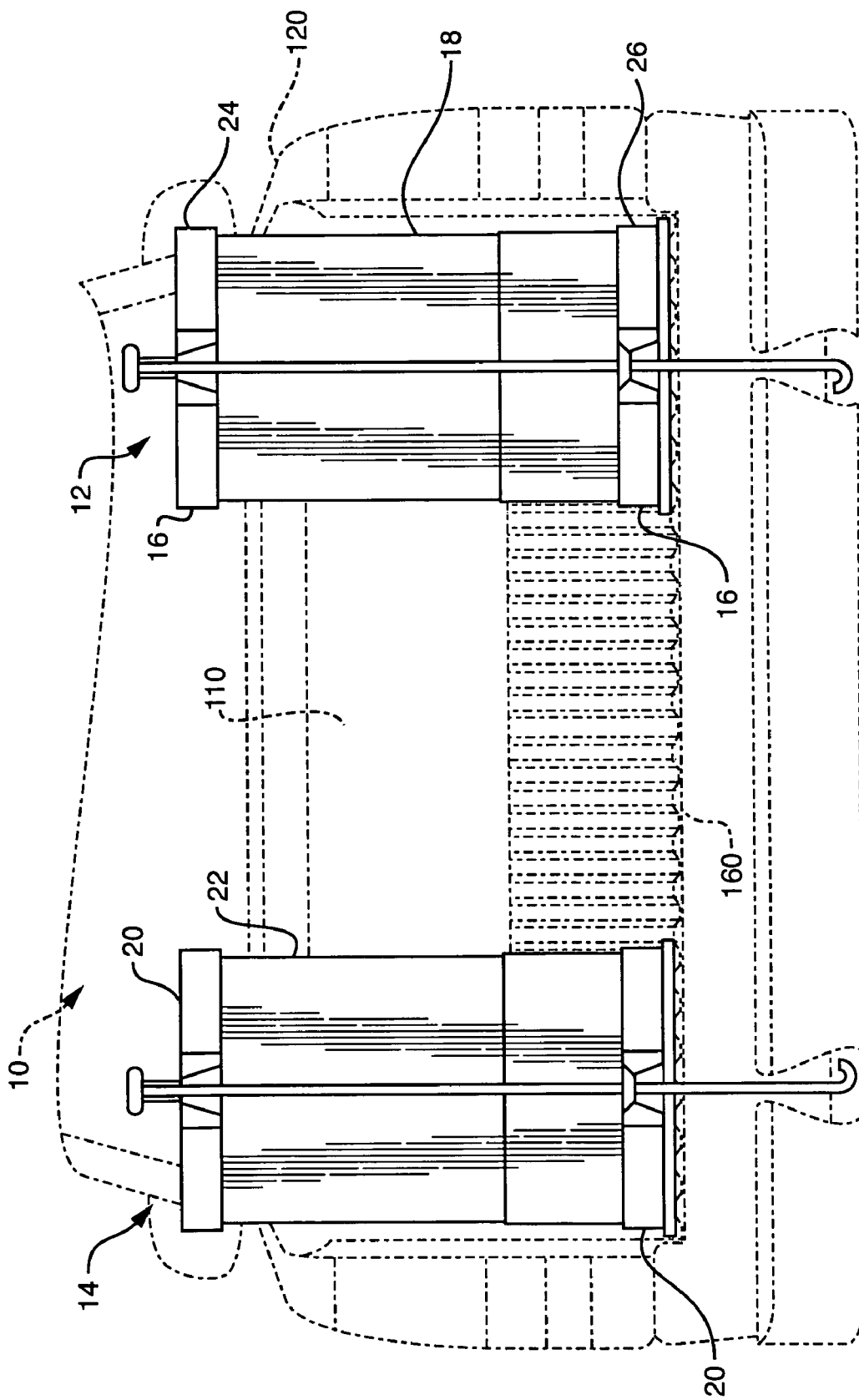
FIG. 2 is a rear view of the pickup truck showing the vehicle ballast system with a pair of ballast units.
Figure 3:
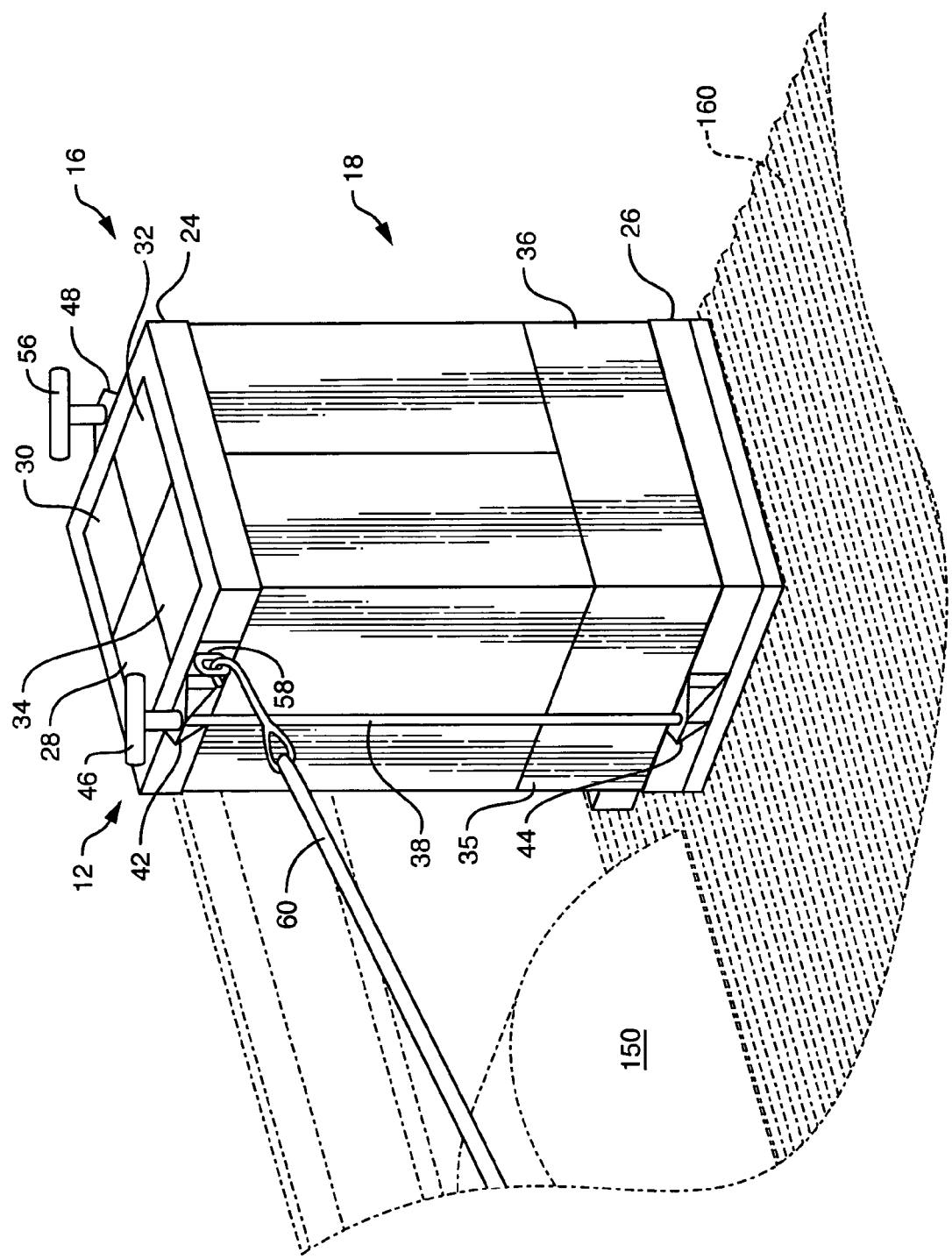
FIG. 3 is an oblique view of a first side ballast unit of the vehicle ballast system of the present invention shown as positioned in the bed of the pickup truck.
Figure 4:
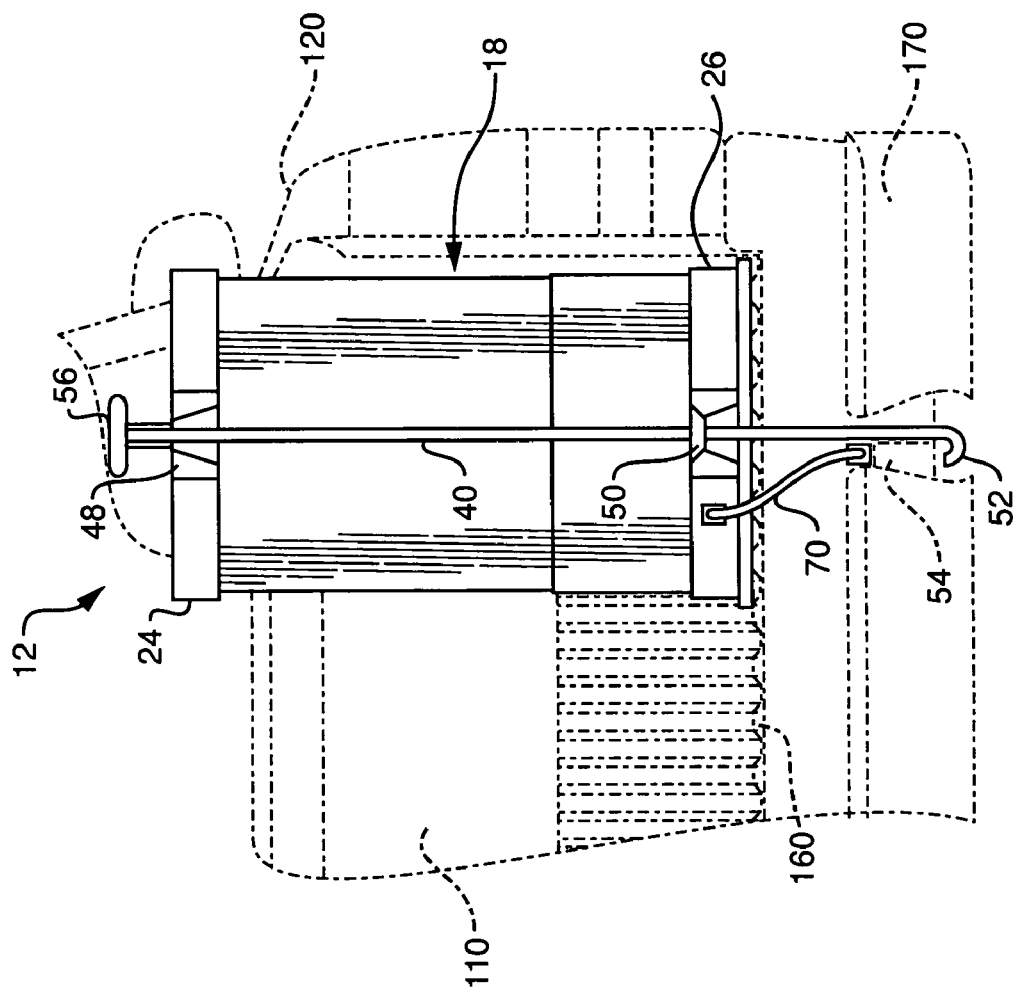
FIG. 4 is a partial rear view showing a closer view of the ballast unit shown in FIG. 3.

As illustrated in FIGS. 2–4, the vehicle ballast system 10 preferably includes a first ballast unit 12 and a second ballast unit 14. Alternatively, a single ballast unit may be employed, or more than two ballast units may be employed, dependent upon the space available for the system 10 and the ballast requirements. Nevertheless, in the preferred embodiment of the invention shown in these figures, there are two ballast units that may be spaced apart from one another as shown. Alternatively, they may be spaced in a different manner or placed together if deemed appropriate. However, in general, the ballast units 12 and 14 should be positioned somewhere along the same vertical plane as the respective wheels of the truck 100, preferably behind the respective well wheels, such as wheel well 150 shown in FIG. 3 associated with first ballast unit 12. The first ballast unit 12 may be positioned within the bed 110 in the vicinity of the rear end 120 on a first side thereof. The second ballast unit 14 may also be positioned within the bed 110 in the vicinity of the rear end 120 on a second side thereof. The first ballast unit 12 and the second ballast unit 14 rest on a floor 160 of the truck bed 110 when the system 10 is in use.

Each ballast unit of the system 10 includes a frame set, a ballast element, movable retaining rods, and a tether. As shown in FIG. 2, the first ballast unit 12 includes a first frame set 16 and a first ballast element 18, and second ballast unit 14 includes a second frame set 20 and a second ballast element 22. The respective frame sets are configured and arranged to retain the ballast elements in place within the frame sets. Further, the frame sets are configured and arranged to be removably affixed to the vehicle. As illustrated in FIGS. 2–4 in regard to the first ballast unit 12, the first frame set 16 includes an upper frame 24 and a lower frame 26. The upper frame 24 is spaced from the lower frame 26 by the first ballast element 18. The first ballast element 18 may be formed of a single structure, or preferably a plurality of structures, such as the six ballast pieces 28, 30, 32, 34, 35, and 36 shown in FIG. 4. More or fewer structures may be employed. The structures are preferably solid concrete blocks. Of course, other materials may be used as ballast, such as metallic materials, for example.

Figure 5:
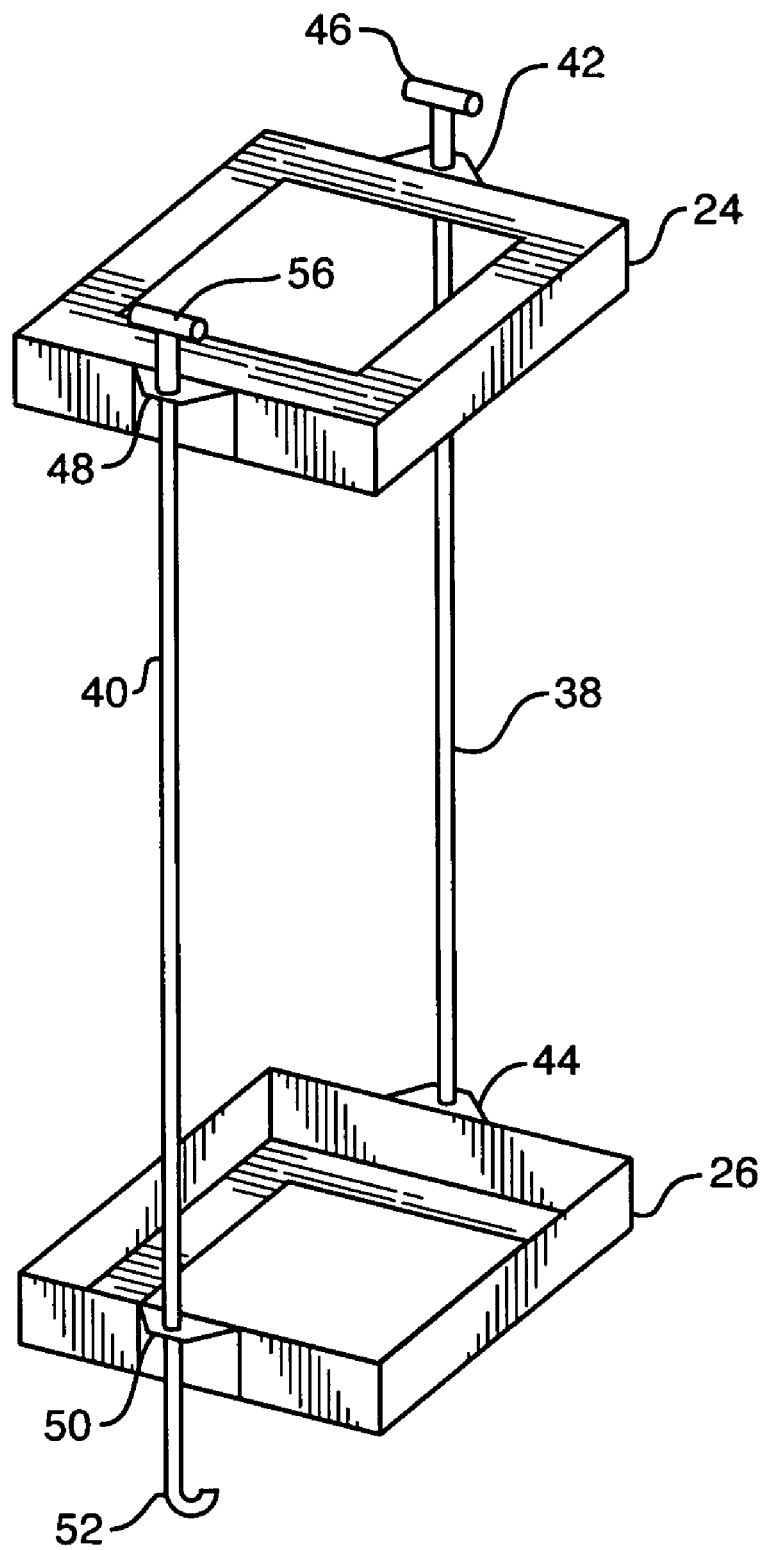
FIG. 5 is a perspective view of the frame set for a ballast unit of the vehicle ballast system of the present invention.

With continuing reference to FIG. 3, and with reference to FIG. 5, the first frame set 16 further includes a front retaining rod 38 and a rear retaining rod 40. The front retaining rod 38 is rotatably and removably positioned within a clearance hole of upper front bracket 42 of upper frame 24 and a clearance hole of lower front bracket 44 of lower frame 26. The front retaining rod 38 is preferably threaded at least at the opposing ends thereof. The lower bracket 44 includes a nut or other reversible affixing means below the clearance hole thereof. One threaded or connecting end of the front retaining rod 38 may be threadingly connected to the nut or affixing means of the lower front bracket 44. In this way, when the ballast unit 18 is placed in the lower frame 26 and the upper frame 24 then placed on top of the ballast unit 18, the front retaining rod 38 may be threaded into the nut of lower front bracket 44 to secure partially the ballast unit 18 in place between the upper frame 24 and the lower frame 26. The ballast unit 12 further preferably includes a front rod handle 46 that is either internally threaded, or that includes affixed thereto a threaded nut. The opposing end of the front retaining rod 38 passing through the clearance hole of the upper front bracket 42 may be threadingly affixed to the front rod handle 46. The front rod handle 46 may be rotated in a first direction to draw the front retaining rod 38 upwardly in a manner that draws the upper frame 24 and the lower frame 26 together, thereby securing the ballast 18 in place. The front rod handle 46 may be rotated in the reverse direction to loosen the front retaining rod 38 when the ballast 18 is to be moved. It is to be understood that other affixing means may be employed to releasably secure the front retaining rod 38 in position when desired. For example, a release pin or clip may be used to fix the front retaining rod 38 to either or both of the upper front bracket 42 and lower front bracket 44.

The rear retaining rod 40 shown in FIGS. 4 and 5 is configured and arranged differently from that of the front retaining rod 38. Specifically, the rear retaining rod 40 of these figures is of a form requiring its placement at the rear end 120 of the vehicle 100 in a manner that ensures the first ballast unit 12 will be connected to the rear end 120 of the vehicle 100. If the first ballast unit 12 is to be deployed elsewhere in the truck bed 110, the rear retaining rod 40 may be configured more like the front retaining rod 38 and the first ballast unit 12 removably connected to the vehicle 100 in a different manner than described herein. In regard to the first ballast unit 12 of FIGS. 4 and 5, the rear retaining rod 40 is rotatably and removably positioned within a clearance hole of upper rear bracket 48 of upper frame 24 and within a clearance hole of lower rear bracket 50 of lower frame 26. The rear retaining rod 40 is preferably threaded at least at the upper end thereof. In this way, when the ballast unit 18 is placed in the lower frame 26 and the upper frame 24 then placed on top of the ballast unit 18, the rear retaining rod 40 may be positioned within the clearance holes of the upper rear bracket 48 and the lower rear bracket 50.

The rear retaining rod 40 of FIGS. 4 and 5 additionally includes at a lower end thereof an angled or hook terminus 52 for removably fixing the rear retaining rod 40 to the vehicle 100. That fixing may be accomplished by connecting the terminus 52 to the frame of the vehicle 100, or preferably by adding a vehicle bracket 54 to the rear end 120 of the vehicle in front of the vehicle bumper 170 (if one exists). The lower portion of the rear retaining rod 40 may be threaded to provide for the removable fixing. The rear retaining rod 40 preferably includes a rear rod handle 56 that is either internally threaded, or that includes affixed thereto a threaded nut. The upper end of the rear retaining rod 40 passing through the clearance hole of the upper rear bracket 48 may be threadingly affixed to the rear rod handle 56. The rear rod handle 56 may be rotated in a first direction to draw the rear retaining rod 40 upwardly in a manner that draws the upper frame 24 and the lower frame 26 together, thereby securing the ballast 18 in place. The rear rod handle 56 may be rotated in the reverse direction to loosen the rear retaining rod 40 when the ballast 18 is to be moved. It is to be understood that other affixing means may be employed to releasably secure the rear retaining rod 40 in position when desired. For example, a release pin or clip may be used to fix the rear retaining rod 40 to either or both of the upper rear bracket 48 and lower rear bracket 50. The front retaining rod 38 and the rear retaining rod 40 are preferably tightened and loosened in substantial unison so that they may both be positioned within their respective brackets as needed.

Figure 6:
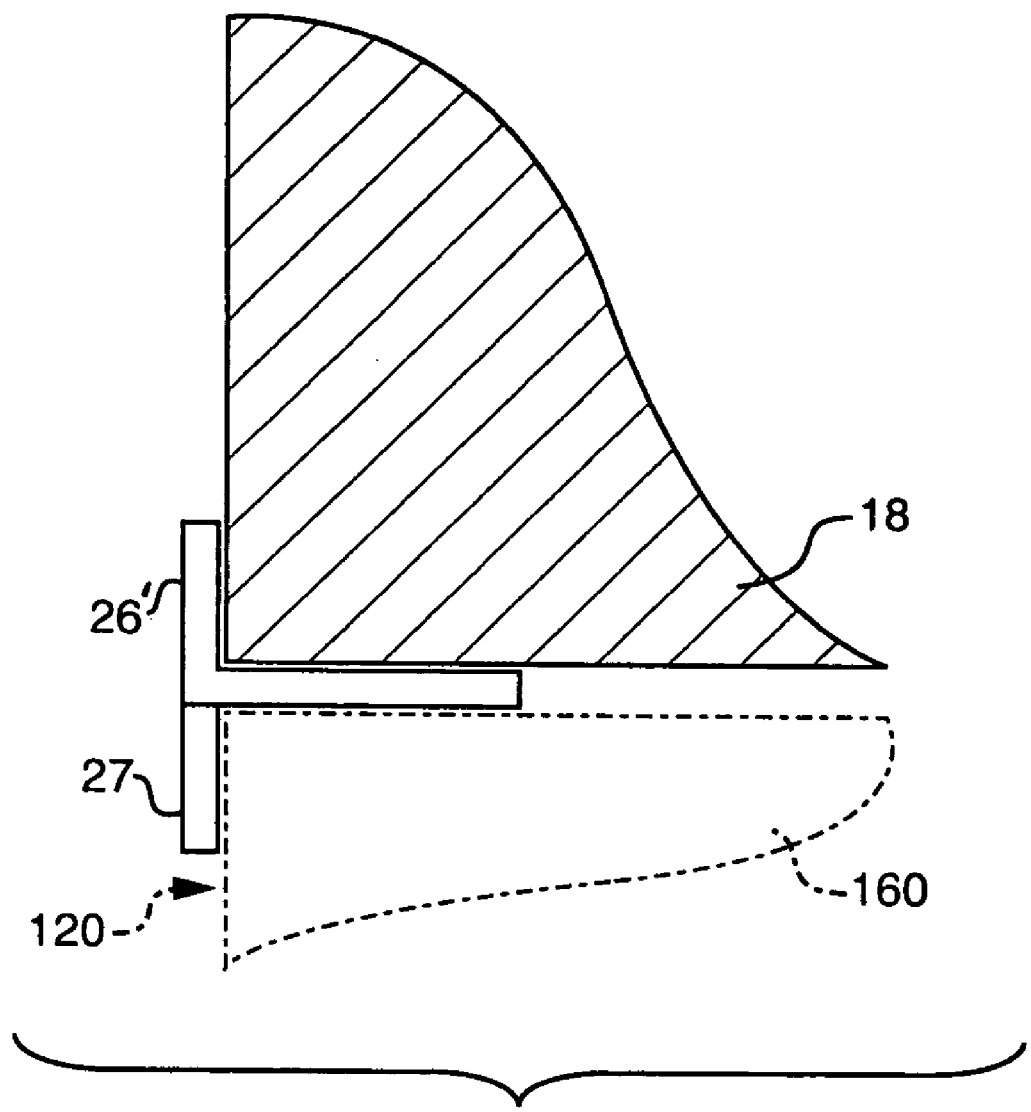
FIG. 6 is a side view of an optional modified lower frame including a rear retaining tab.

An alternative embodiment of the lower frame of the frame set is shown in FIG. 6. The alternative lower frame 26' includes affixed thereto one or more rear retaining tabs, represented by rear retaining tab 27. The retaining tab 27 is preferably welded to the angle of lower frame 26' and is of sufficient configuration to ensure that it extends below the plane of the truck bed floor 160 at the rear end 120 of the truck. The tab 27 is configured and arranged to act as a blocking mechanism for forward movement of the ballast unit 12/14 forward within the truck bed 110, such as may otherwise occur during vehicle deceleration.

Returning to FIG. 3, the first ballast unit 12 may further include an anchor tab 58 at a front end of the upper frame 24 to the inside of the relative position of the upper front bracket 42 approximately near the upper front bracket 42. The anchor tab 58 may be used to releasably connect a tether 60, such as a strap with a release hook, to a securing point of the vehicle 100. Optionally, as shown in FIG. 4, a lanyard 70, such as a shock-absorbent lanyard available from DBI/SALA of Red Wing, Minn., may be affixed to the rear of the vehicle 100 at its frame, at one end, and to the lower frame 26 at its opposing end. The lanyard 70 is arranged as a restraint, which deploys upon sudden deceleration of the vehicle 100, to minimize substantial ballast shifting. The tether 60 may be strapping or webbing such as is used to secure loads in place on large flatbed trucks. The tether 60 may be fabricated of metallic or nonmetallic material, provided it is flexible enough to allow it to be tightened in place once the ballast unit 12 is in a desired position. It is to be understood that one or more other tether components may be used to secure the ballast unit 12 to different securing points of the vehicle once the first ballast unit 12 is deployed where desired within the vehicle bed 110. The combination of one or more tethers such as tether 60, and/or the attachment of the terminus 52 of the rear retaining rod 40 to the vehicle ensures that the first ballast unit 12 will remain in place while the vehicle 100 is in use, provided the upper frame 24 and the lower frame 26 are secured about the ballast element 18 using the front retaining rod 38 and the rear retaining rod 40.

The vehicle ballast system 10 of the present invention may be formed of a single ballast unit, such as the first ballast unit 12. Alternatively, a plurality of such ballast units may be positioned where desired in the vehicle bed 110, such as second ballast unit 14. While the focus of the description of the vehicle ballast system 10 with respect to FIGS. 3–5 has been directed to the first ballast unit 12, it is to be understood that the second ballast unit 14 is preferably similarly configured and arranged, including the use of upper and lower frames, front and rear retaining rods and brackets, and the removable fixing to the vehicle 100 through the use of one or more tethers and/or the rear retaining rod lower terminus connection to the vehicle 100. The upper frame 24 and the lower frame 26 of the first ballast unit 12, or similar frames of other ballast units, may be fabricated as unitary pieces, or combinations of pieces joined together. The frames may be fabricated of metallic or nonmetallic material. For example, the frames may be fabricated of metal angles that are welded together. The brackets may also be fabricated of metal, or other suitable material and welded or removably affixed to the respective frames.

While the present invention has been described with particular reference to certain embodiments of the vehicle ballast system 10, it is to be understood that it includes all reasonable equivalents thereof as defined by the following appended claims.

What is claimed is:

1. A vehicle ballast system to improve vehicle balance, the vehicle ballast system comprising:
   a. a frame set including an upper frame and a lower frame;
   b. a first retaining rod and a second retaining rod, wherein the first retaining rod and the second retaining rod are each removably affixable to the upper frame and the lower frame;
   c. a ballast element removably retainable within the frame set; and
   d. means for removably retaining the frame set to the vehicle.

2. The vehicle ballast system as claimed in claim 1 wherein the upper frame includes a first upper retaining bracket and a second upper retaining bracket, and the lower frame includes a first lower retaining bracket and a second lower retaining bracket, wherein the first retaining rod is removably insertable into the first upper retaining bracket and the first lower retaining bracket, and the second retaining rod is removably insertable into the second upper retaining bracket and the second lower retaining bracket.

3. The vehicle ballast system as claimed in claim 2 wherein the first retaining rod and the second retaining rod are threaded, the vehicle ballast system further including a first rod handle removably affixable to the first retaining rod at the first upper retaining bracket, and a second rod handle removably affixable to the second retaining rod at the second upper retaining bracket.

4. The vehicle ballast system as claimed in claim 2 wherein the second retaining rod includes a lower terminus removably affixable to a vehicle bracket.

5. The vehicle ballast system as claimed in claim 1 further comprising a tether removably connected to the upper frame of the frame set.

6. The vehicle ballast system as claimed in claim 5 wherein the upper frame includes an anchor for removably connecting the tether to the upper frame.

7. The vehicle ballast system as claimed in claim 1 wherein the ballast element includes a plurality of ballast structures.

8. The vehicle ballast system as claimed in claim 7 wherein the plurality of ballast structures are concrete blocks.

9. The vehicle ballast system as claimed in claim 1 wherein the upper frame and the lower frame of the frame set are fabricated of metal angles.

10. The vehicle ballast system as claimed in claim 1 wherein the lower frame further includes a rear retaining tab.

11. A vehicle ballast system to improve vehicle balance, the vehicle ballast system comprising:
 a. a first frame set including a first upper frame and a first lower frame;
 b. a first front retaining rod and a first rear retaining rod, wherein the first front retaining rod and the first rear retaining rod are each removably affixable to the first upper frame and the first lower frame;
 c. a first ballast element removably retainable within the first frame set;
 d. first means for removably retaining the first frame set to the vehicle;
 e. a second frame set spaced from the first frame set, the second frame set including a second upper frame and a second lower frame;
 f. a second front retaining rod and a second rear retaining rod, wherein the second front retaining rod and the second rear retaining rod are each removably affixable to the second upper frame and the second lower frame;
 g. a second ballast element removably retainable within the second frame set; and
 h. second means for removably retaining the second frame set to the vehicle.

12. The vehicle ballast system as claimed in claim 11 wherein the first upper frame and the second upper frame each includes a front upper retaining bracket and a rear upper retaining bracket, and each of the first lower frame and the second lower frame includes a front lower retaining bracket and a rear lower retaining bracket, wherein the first front retaining rod is removably insertable into the front upper retaining bracket and the front lower retaining bracket of the first frame set, the first rear retaining rod is removably insertable into the rear upper retaining bracket and the rear lower retaining bracket of the first frame set, the second front retaining rod is removably insertable into the front upper retaining bracket and the front lower retaining bracket of the second frame set, and the second rear retaining rod is removably insertable into the rear upper retaining bracket and the rear lower retaining bracket of the second frame set.

13. The vehicle ballast system as claimed in claim 12 wherein each of the retaining rods is threaded, the vehicle ballast system further including a first rod handle removably affixable to the first front retaining rod at the front upper retaining bracket of the first frame set, a second rod handle removably affixable to the first rear retaining rod at the rear upper retaining bracket of the first frame set, a third rod handle removably affixable to the second front retaining rod at the front upper retaining bracket of the second frame set, and a fourth rod handle removably affixable to the second rear retaining rod at the rear upper retaining bracket of the second frame set.

14. The vehicle ballast system as claimed in claim 12 wherein the first rear retaining rod and the second rear retaining rod each includes a lower terminus removably affixable to a vehicle bracket.

15. The vehicle ballast system as claimed in claim 11 further comprising a first tether removably connected to the first upper frame of the first frame set and a second tether removably connected to the second upper frame of the second frame set.

16. The vehicle ballast system as claimed in claim 15 wherein the first upper frame includes a first anchor for removably connecting the first tether to the first upper frame, and the second upper frame includes a second anchor for removably connecting the second tether to the second upper frame.

17. The vehicle ballast system as claimed in claim 11 wherein each of the first ballast element and the second ballast element includes a plurality of ballast structures.

18. The vehicle ballast system as claimed in claim 17 wherein the plurality of ballast structures are concrete blocks.

19. The vehicle ballast system as claimed in claim 11 wherein the first and second upper frames and the first and second lower frames are fabricated of metal angles.

20. The vehicle ballast system as claimed in claim 11 wherein the first lower frame further includes a first rear retaining tab and the second lower frame further includes a second rear retaining tab.

* * * * *